United States Patent

Xiao

[11] Patent Number: 6,027,400
[45] Date of Patent: Feb. 22, 2000

[54] SUPPORTER FOR SANDING DEVICE

[76] Inventor: Alan Xiao, No. 436, Sec.1, Chong San Road, Tarn Tzu Hsiang, Taichung Hsien, Taiwan

[21] Appl. No.: 09/058,736

[22] Filed: Apr. 13, 1998

[51] Int. Cl.⁷ .................................................. F16M 11/04
[52] U.S. Cl. ........................ 451/361; 451/344; 248/291.1
[58] Field of Search ..................................... 451/282, 359, 451/360, 361, 344, 339, 442; 248/291.1, 676

[56] References Cited

U.S. PATENT DOCUMENTS

| | | | |
|---|---|---|---|
| 2,486,386 | 11/1949 | Bingaman | 451/439 |
| 2,671,700 | 3/1954 | Seyffert | 451/360 X |
| 3,375,617 | 4/1968 | Kaufman et al. | 451/359 |
| 4,033,531 | 7/1977 | Levin | 248/16 |
| 4,449,330 | 5/1984 | McCarthy et al. | 451/439 X |
| 4,480,809 | 11/1984 | Healey | 248/185 |
| 5,419,087 | 5/1995 | Haddy | 451/344 |

*Primary Examiner*—David A. Scherbel
*Assistant Examiner*—Anthony O Jini

[57] ABSTRACT

A supporter for supporting a sanding device includes a base for engaging with a work piece to be machined. A rod is rotatably secured on the base. A bracket is secured to the rod for supporting the sanding device and for allowing the sanding device to be rotated about the pivot shaft. The bracket is pivotally secured to the rod. One or more fasteners are engaged with the rod and the bracket for adjusting an angular position of the bracket relative to the rod. The rod is secured to the base by one or more bolts.

6 Claims, 5 Drawing Sheets

SUPPORTER FOR SANDING DEVICE

BACKGROUND OF THE INVENTION

1. Field of the Invention

The present invention relates to a supporter, and more particularly to a supporter for a sanding device.

2. Description of the Prior Art

Typical sanding devices are held by the user for sanding the surfaces of the work pieces manually. The chamfer angles and the rounded angles to be formed on the work pieces are also approximately and manually formed by user. The chamfer angles and the rounded angles may not be precisely formed on the work pieces.

The present invention has arisen to mitigate and/or obviate the afore-described disadvantages of the conventional sanding devices.

SUMMARY OF THE INVENTION

The primary objective of the present invention is to provide a supporter for supporting the sanding device and for allowing the sanding device to precisely form the chamfer angles and the rounded angles on the work pieces.

In accordance with one aspect of the invention, there is provided a supporter for supporting a sanding device, the supporter comprising a base for engaging with a work piece to be machined, a rod rotatably secured on the base at a pivot shaft, for allowing the rod to be rotated about the pivot shaft, and a bracket secured to the rod for supporting the sanding device and for allowing the sanding device to be rotated about the pivot shaft.

The base includes a pair of panels having an included angle formed therebetween for engaging with the work piece, and includes at least one bakelite secured to the panels for engaging with the work piece.

The bracket is pivotally secured to the rod at a pivot axle, the supporter further includes at least one fastener engaged through the rod and engaged with the bracket for adjusting an angular position of the bracket relative to the rod. A securing means is further provided for releasably securing the rod to the base. The base includes a pair of braces extended upward from the base, the releasably securing means includes a ring secured to the rod and includes a releasably fastening means for securing the ring to a first of the braces.

The base includes a pair of braces extended upward from the base, the rod is rotatably secured between the braces, the base includes means for rotatably securing the rod between the braces. The rod includes two ends each having a bearing, the rotatably securing means includes a pair of bolts engaged through the braces and engaged with the bearings for rotatably securing the rod to the braces. A pair of blocks each includes a screw hole for engaging with the bolts, the blocks each includes a slit intersecting with the screw hole for defining a pair of flaps and for allowing the flaps to be moved toward each other. The braces are inclined relative to the base.

A securing device is further provided for securing the sanding device to the bracket. The securing device includes two pairs of bars each pair of which include a first end pivotally coupled to the bracket at a pivot pin and each pair of which include a second end, a beam secured between the second ends of the bars, and a fastener engaged through the beam and engaged with the sanding device for positioning the sanding device in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
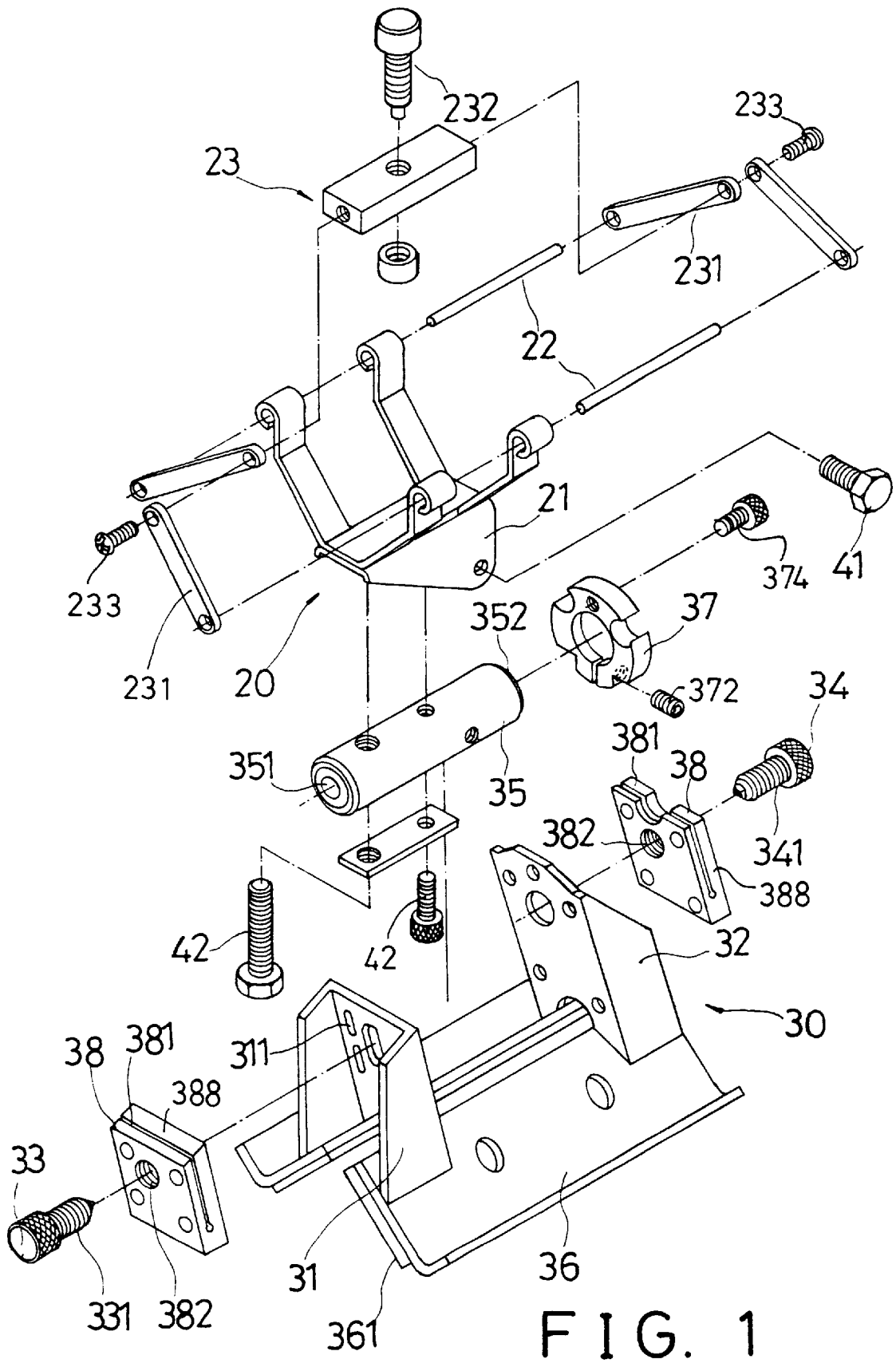
FIG. 1 is an exploded view of a sanding device supporter in accordance with the present invention.
Figure 2:
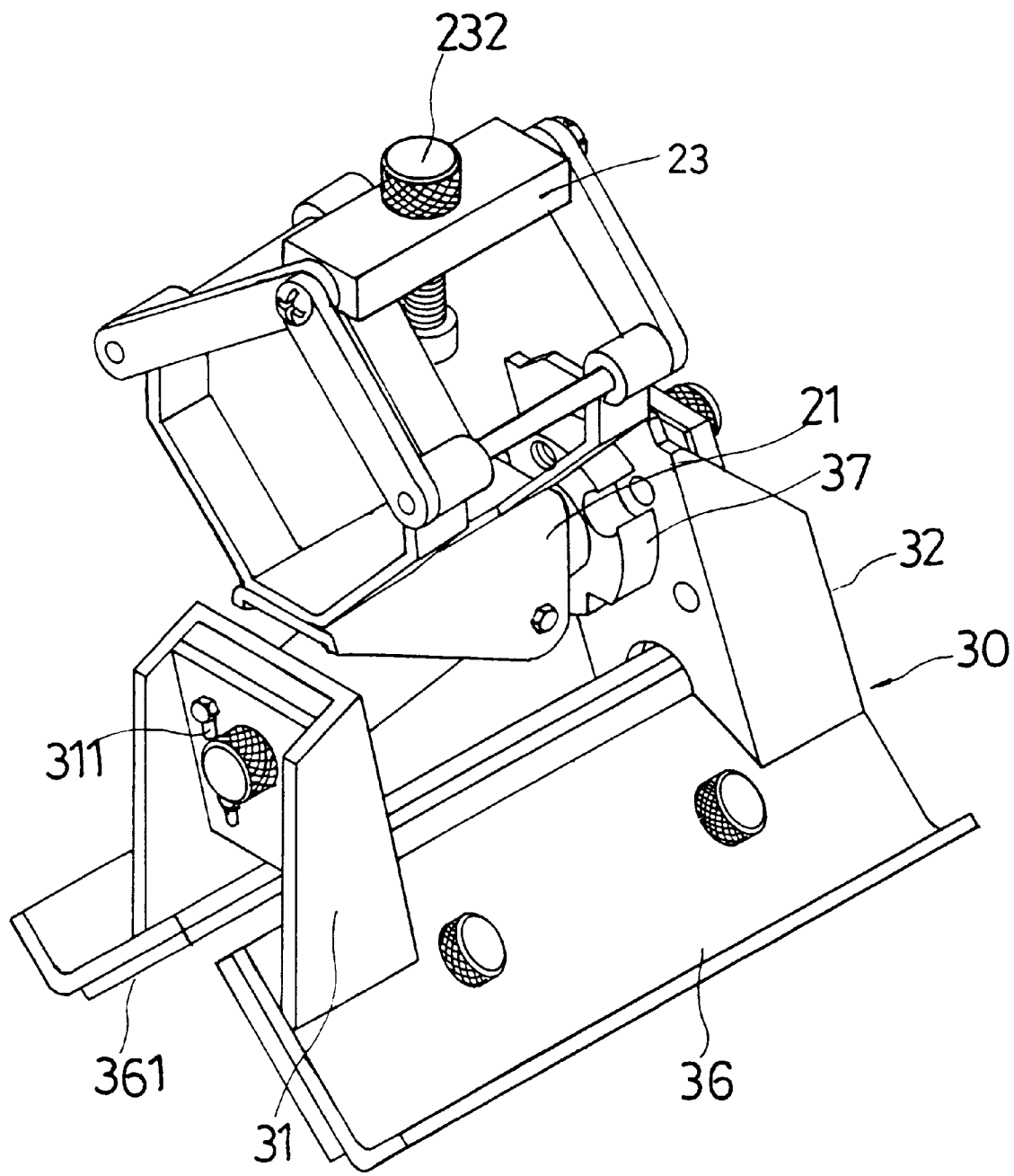
FIG. 2 is a perspective view of the sanding device supporter.
Figure 3:
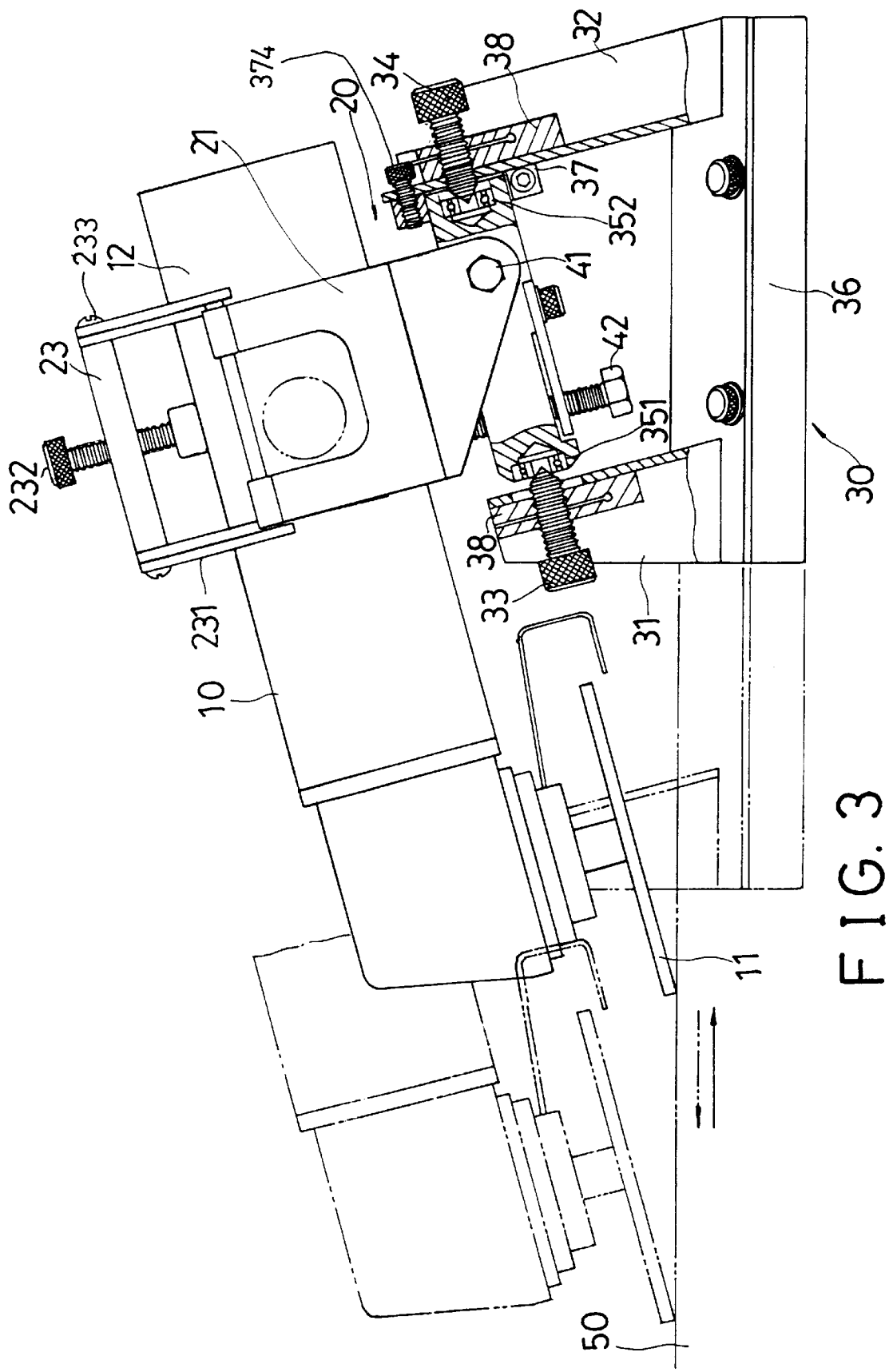
FIG. 3 is a partial cross sectional view of the sanding device.

Referring to the drawings, and initially to FIGS. 1–3, a supporter in accordance with the present invention is provided for supporting the typical sanding device and for allowing the sanding device to precisely form the chamfer angles and the rounded angles on the work pieces 50 (FIGS. 3, 4) to be machined. The supporter comprises a base 30 for engaging onto the work piece and moving along the work piece to be sanded. The base 30 preferably includes a pair of panels 36 arranged with an included therebetween for engaging with the corner area of the work piece and includes one or more bakelites 361 for facilitating the sliding movement of the base 30 on the work piece. The base 30 includes a pair of braces 31, 32 extended upward therefrom. As best shown in FIG. 3, the braces 31, 32 are tilted relative to the base 30.

A rod 35 is secured between the braces 31 , 32 by two bolts 33, 34 each of which includes an outer thread 331, 341. The rod 35 includes two ends each having a bearing 351, 352 for engaging with the bolts 33, 34 and for allowing the rod 35 to be rotated about the bolts 33, 34, such that the bolts 33, 34 form a pivot shaft for securing the rod 35 to the braces 31 , 32 of the base 30. Two blocks 38 each includes a slit 381 formed therein for forming a pair of flaps 388 and each includes a screw hole 382 intersecting with the slit 381 for engaging with the bolts 33, 34 respectively. Before the bolts 33, 34 are threaded into the screw holes 382, the flaps 388 are forced toward each other. The flaps 388 are then released for applying a locking force against the bolts 33, 34 when the bolts 33, 34 are threaded into the screw holes 382. A ring 37 is secured to the rod 35 by a fastener 372 and may be secured to the brace 32 by another fastener 374. The braces 31 , 32 are inclined relative to the base 30 for tiltedly supporting the rod 35 relative to the base 30, best shown in FIG. 3. As shown in FIG. 1, the brace 31 includes a number of oblong holes 311 for engaging with the bolt 33 and for allowing the bolt 33 to be adjusted upward and downward relative to the brace 31 and for allowing the rod 35 to be adjusted to various tilted angle relative to the base 30.

A bracket 20 is provided for supporting the sanding device 10 which has a body portion 12 to be secured to the bracket 20 and which includes a sanding pad member 11 for engaging with the work piece. The bracket includes a pair of walls 21 extended downward for pivotally coupled to the rod 35 at a pivot axle 41. One or more fasteners 42 are threadedly engaged with the rod 35 and engaged with the bracket 20 for adjusting the relative angular position of the bracket 20 to the rod 35 and thus the base 30. Two pairs of bars 231 have one ends pivotally coupled to the bracket 20 at two pivot pins 22 and have the other ends pivotally secured together at one or more fasteners 233. A beam 23 is secured between the pairs of bars 231 by the fasteners 233. A bolt 232 is threadedly engaged through the beam 23 and engaged with the sanding device 10 for securing the sanding device 10 in place.

Figure 5:
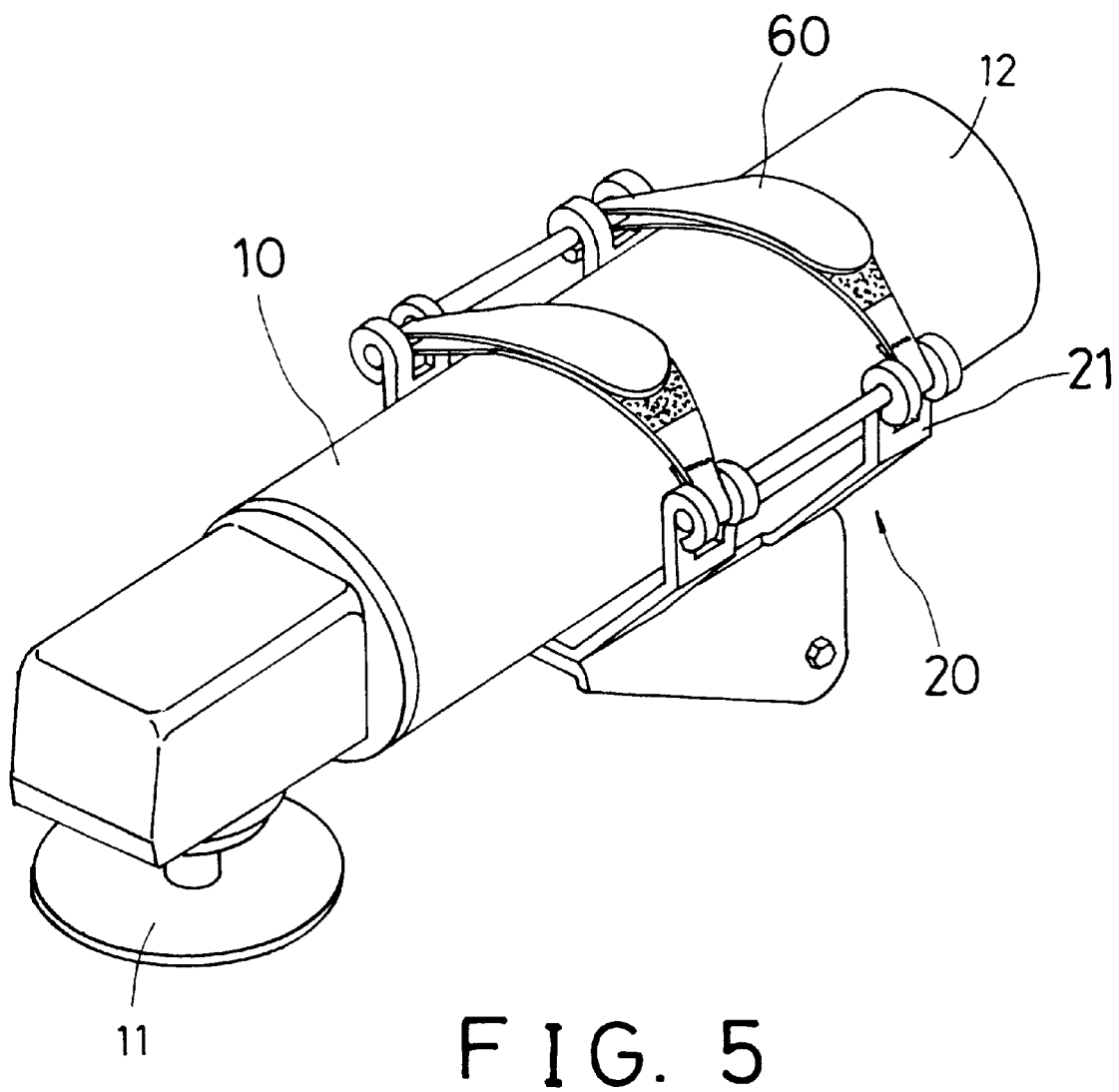
FIG. 5 is a perspective view illustrating the other application of the device for securing the sanding device.

Alternatively, as shown in FIG. 5, one or more hook and loop devices 60 may be provided for easily and quickly securing the sanding device 10 to the bracket 20.

Figure 4:
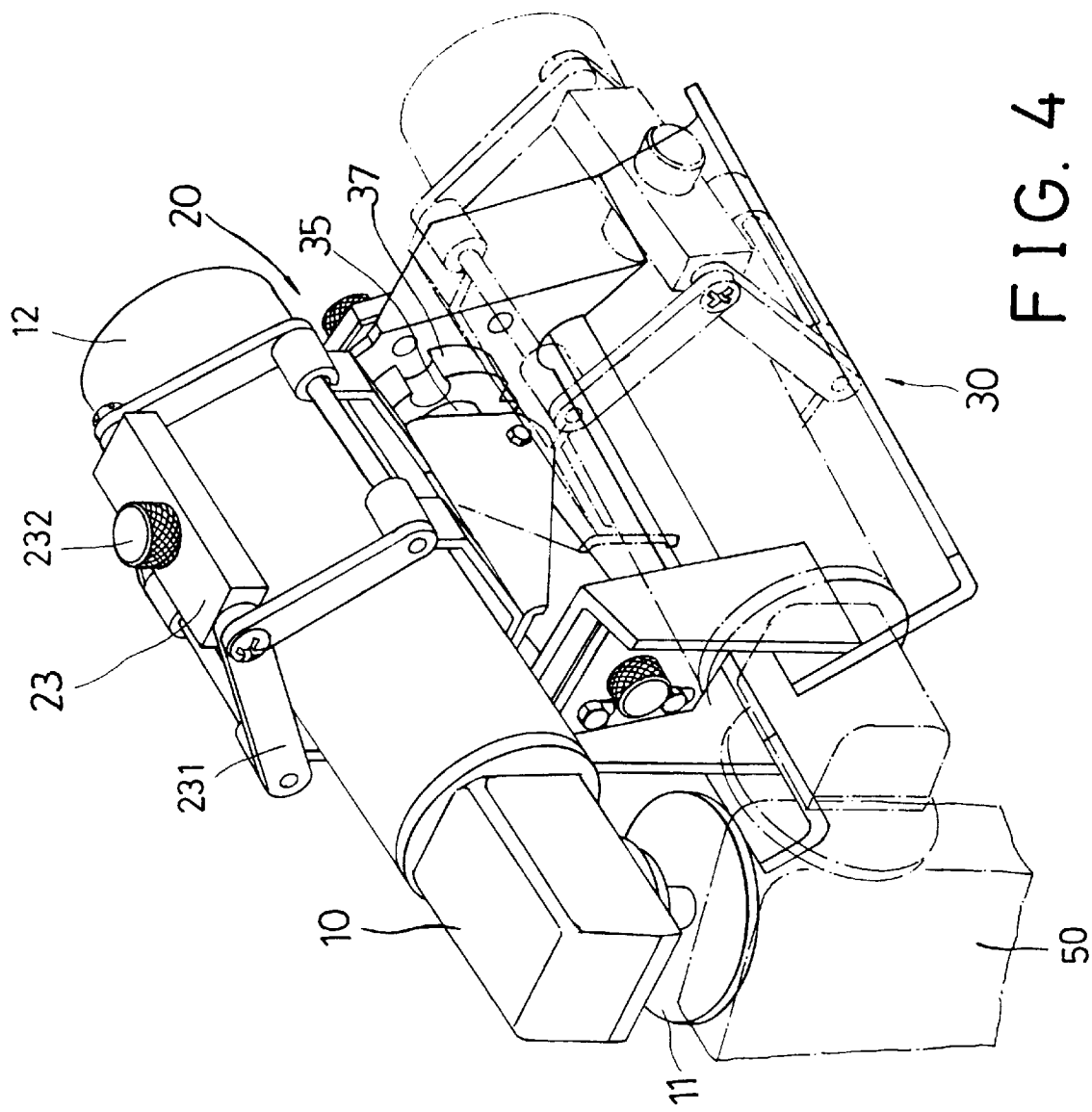
FIG. 4 is a perspective view illustrating the operation of the sanding device supporter.

In operation, as shown in FIG. 3, the sanding device 10 may be secured to the bracket 20 with a suitable inclination. When the base 30 is slid along the work piece 50 or when the work piece 50 is moved relative to the base 30, the sanding pad member 11 may be used for forming a chamfer angle on the work piece 50. As shown in FIG. 4, when the fastener 374 is released for releasing the ring 37 and thus the rod 35, the rod 35 and the bracket 20 and the sanding device 10 may thus be rotated about the pivot shaft that is formed by the bolts 33, 34, such that the sanding pad member 11 may be used for forming a rounded angle on the work piece 50.

Accordingly, the supporter in accordance with the present invention includes a configuration for supporting the sanding device and for allowing the sanding device to precisely form the chamfer angles and the rounded angles on the work pieces.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A supporter for supporting a sanding device, said supporter comprising:
   a base for engaging with a work piece to be machined, said base including a pair of braces extended upward from said base,
   a rod rotatably secured on said base at a pivot shaft, for allowing said rod to be rotated about said pivot shaft,
   a bracket secured to said rod for supporting the sanding device and for allowing the sanding device to be rotated about said pivot shaft, said bracket being pivotally secured to said rod at a pivot axle,
   at least one fastener engaged through said rod and engaged with said bracket for adjusting an angular position of said bracket relative to said rod, and
   means for releasably securing said rod to said base, said releasably securing means including a ring secured to said rod and includes a releasably fastening means for securing said ring to a first of said braces.

2. The supporter according to claim 1, wherein said base includes a pair of panels having an included angle formed therebetween for engaging with the work piece, and includes at least one bakelite secured to said panels for engaging with the work piece.

3. The supporter according to claim 1, wherein said rod is rotatably secured between said braces, said base includes means for rotatably securing said rod between said braces.

4. The supporter according to claim 3, wherein said rod includes two ends each having a bearing, said rotatably securing means includes a pair of bolts engaged through said braces and engaged with said bearings for rotatably securing said rod to said braces.

5. The supporter according to claim 1, wherein said braces are inclined relative to said base.

6. A supporter for supporting a sanding device, said supporter comprising:
   a base for engaging with a work piece to be machined, said base including a pair of braces extended upward from said base,
   a rod rotatably secured on said base at a pivot shaft, for allowing said rod to be rotated about said pivot shaft, said rod being rotatably secured between said braces, said rod including two ends each having a bearing,
   a bracket secured to said rod for supporting the sanding device and for allowing the sanding device to be rotated about said pivot shaft,
   means for rotatably securing said rod between said braces, said rotatably securing means including a pair of bolts engaged through said braces and engaged with said bearings for rotatably securing said rod to said braces, and
   a pair of blocks each including a screw hole for engaging with said bolts, said blocks each including a slit intersecting with said screw hole for defining a pair of flaps and for allowing said flaps to be moved toward each other.

\* \* \* \* \*